United States Patent
Abe et al.

(10) Patent No.: US 6,893,553 B1
(45) Date of Patent: May 17, 2005

(54) HYDROPROCESSING CATALYST AND USE THEREOF

(75) Inventors: Satoshi Abe, Saijo (JP); Yasuhito Takahashi, Niihama (JP); Akira Hino, Niihama (JP); Mark De Boer, Amersfoort (NL)

(73) Assignees: Akzo Nobel N.V. (NL); Nippon Ketjen Co., Ltd. (JP)

( * ) Notice: Subject to any disclaimer, the term of this patent is extended or adjusted under 35 U.S.C. 154(b) by 0 days.

(21) Appl. No.: 09/889,967

(22) PCT Filed: Jan. 20, 2000

(86) PCT No.: PCT/EP00/00489

§ 371 (c)(1),
(2), (4) Date: Oct. 9, 2001

(87) PCT Pub. No.: WO00/44856

PCT Pub. Date: Aug. 3, 2000

(30) Foreign Application Priority Data

Jan. 26, 1999 (JP) .......................... 11-017669

(51) Int. Cl.$^7$ ........................ C10G 47/00; C10G 45/04; C10G 45/60; B01J 23/04
(52) U.S. Cl. .............. 208/208 R; 208/111.3; 208/111.35; 208/213; 208/216 R; 208/216 PP; 208/217; 208/251 H; 502/305; 502/313; 502/325; 502/332
(58) Field of Search .................... 208/109, 111.3, 208/111.35, 213, 216 R, 216 PP, 217, 251 H; 502/305, 313, 325, 332

(56) References Cited

U.S. PATENT DOCUMENTS 3,770,617 A * 11/1973 Riley et al. ............... 208/216
3,770,618 A * 11/1973 Adams et al. ............... 208/216
3,925,197 A * 12/1975 Van Klinken et al. ...... 208/216
4,211,634 A * 7/1980 Bertolacini et al. .......... 208/59
5,266,188 A   11/1993 Kukes et al. ........... 208/216 R
5,294,329 A * 3/1994 Kramer ...................... 208/108
5,435,908 A   7/1995 Nelson et al. ......... 208/216 PP

FOREIGN PATENT DOCUMENTS

EP  0 437 512 B1   7/1991  ........... C10G/45/06
EP  0 875 287 A2  11/1998  ............ B01J/21/12

OTHER PUBLICATIONS

Determination of Dry–Sludge Content of Fuel Oils: Development of the Shell Hot Filtration Test (SHIFT) W.J. Van Kerkvoort et al. pp. 596–604 (1951), no month.

Japanese Laid Open Patent No.: JP08089816, no dates.
Japanese Laid Open Patent No.: JP06200261, no date.
Japanese Laid Open Patent No.: JP06088081, no date.
Japanese Laid Open Patent No.: JP04502776, no date.

* cited by examiner

*Primary Examiner*—Glenn Caldarola
*Assistant Examiner*—Tam M. Nguyen
(74) *Attorney, Agent, or Firm*—Louis A. Morris

(57) ABSTRACT

The invention pertains to a hydroprocessing catalyst comprising a Group VIB hydrogenation metal component, a non-noble Group VIII hydrogenation metal component, an alkali metal component, and silica. The catalyst has a specific surface area, total pore volume and pore size distribution. The invention also pertains to the use of this catalyst in hydroprocessing of heavy hydrocarbon feedstocks, e.g, in an ebullated bed process.

12 Claims, No Drawings

HYDROPROCESSING CATALYST AND USE THEREOF

The present invention relates to a hydroprocessing catalyst and its use in the hydroprocessing of heavy hydrocarbon oils.

More particularly, the present invention relates to a catalyst suitable for the hydroprocessing of heavy hydrocarbon oils containing a large amount of impurities such as sulphur, Conradson carbon residue (CCR), metals, nitrogen, and asphaltene to effect hydrodesulphurisation (HDS), carbon residue reduction (HDCCR), hydrodemetallisation (HDM), hydrodenitrification (HDN), asphaltene reduction (HDAsp) and/or conversion into lighter products. The present invention also relates to a process for hydroprocessing heavy hydrocarbon oils using said catalyst.

Hydrocarbon oils containing 50 wt % or more of components with a boiling point of 538° C. or higher are called heavy hydrocarbon oils. These include atmospheric residue (AR) and vacuum residue (VR), which are produced in petroleum refining. It is desired to remove impurities such as sulphur from these heavy hydrocarbon oils by hydroprocessing, and to convert them into lighter oils, which have a higher economic value.

Various catalysts have been proposed for this purpose in the art. Generally, these catalysts are capable of efficiently removing sulphur, Conradson carbon residue (CCR), various metals, nitrogen and/or asphaltenes. However, it was found that the decomposition of asphaltenes is generally accompanied by the formation of sediment and sludge. Sediment can be determined by the Shell hot filtration solid test (SHFST). (see Van Kerknoort et al., *J. Inst. Pet.*, 37, p. 596 604 (1951)). Its ordinary content is said to be about 0.19 to 1 wt. % in product with a boiling point of 340° C. or higher collected from the bottom of a flash drum.

Sediment formed during hydroprocessing may settle and deposit in such apparatuses as heat exchangers and reactors, and because it threatens to close off the passage, it may seriously hamper the operation of these apparatuses.

Therefore, in the improvement of hydroprocessing catalysts there is need for a catalyst which achieves a high level of contaminant removal with low sediment formation.

Japanese Patent Laid-Open No. 1994-88081 discloses a hydroprocessing method for heavy hydrocarbon oils by using a catalyst with a specific pore size distribution. In this method a catalyst is used with 3 to 6 wt. % of a Group VIII metal oxide, 4.5 to 24 wt. % of a Group VIB metal oxide, and 0 to 6 wt. % of phosphorus oxides loaded onto a porous alumina carrier which has a specific surface area of 165 to 230 $m^2$/g, a total pore volume of 0.5 to 0.8 ml/g, and a pore size distribution wherein 5% or less of the total pore volume is present in pores with a diameter less than 80 Å, 65–70% of the total pore volume present in pores with a diameter below 250 Å is present in a range of 20 Å below the MPD to 20 Å above the MPD, and 22–29% of the total pore volume is present in pores with a diameter of more than 250 Å.

However, although this method can achieve efficient hydrodesulphurisation and Conradson carbon reduction, it does not solve the problem of sediment formation.

Japanese Patent Laid-Open No. 1994-200261 discloses a hydroprocessing method for heavy oils, and a catalyst used to implement this method. In this reference a catalyst was proposed with 2.2 to 6 wt. % of a Group VIII metal oxide and 7 to 24 wt. % of a Group VIB metal oxide on a porous alumina carrier, which catalyst has a surface area of 150–240 $m^2$/g, a total pore volume of 0.7 to 0.98 ml/g, and a pore size distribution wherein less than 20% of the total pore volume is present in pores with a diameter less than 100 Å, at least 34% of the total pore volume is present in pores with a diameter of 100–200 Å, and 26–46% of the total pore volume is present in pores with a diameter of more than 1000 Å. However, this catalyst does not show a sufficient decrease in sediment formation.

Japanese Patent Disclosure No. 1992-502776 and European Patent No. 0437 512-B disclose a catalyst for demetallisation and hydrodesulphudsation of heavy hydrocarbon oils. This catalyst has 5–11% of its total pore volume in macropores with a diameter of more than 1000 Å and a surface area of at least 75 $m^2$/g. This catalyst does not show a decrease in sediment formation either.

Japanese Patent Laid-Open No. 1996-89816 discloses a hydroprocessing catalyst with at least one hydrogenation metal component loaded onto a carrier containing 2–40 wt. % of silica. This catalyst has a specific surface area of 200–400 $m^2$/g and a total pore volume of 0.4–0.55 ml/g, as measured by way of mercury penetration, with the pore volume present in pores with a diameter of 0 to 300 Å, as determined by nitrogen adsorption, accounting for 75% or more of the pore volume present in pores with a diameter above 40 Å, as determined by mercury penetration. The catalyst has an average pore diameter, as determined by nitrogen adsorption, of 40–90 Å. The pore volume present in pores with a diameter of 300 to 150,000 Å, as determined by mercury intrusion, is 0.01–0.25 ml/g, and the pore volume present in pores with a diameter of 300 to 600 Å, as determined by mercury penetration, makes up 40% or more of the pore volume present in pores with a diameter of 300 to 150,000 Å. However, this catalyst does not show a high level of contaminant removal accompanied by low sediment formation.

The object of the present invention is to provide a catalyst which is suitable for hydroprocessing of a heavy hydrocarbon oil containing a large amount of impurities such as sulphur, Conradson carbon residue, metals, nitrogen, and/or asphaltenes, to obtain efficient removal of these compounds and the production of lighter material with only limited sediment formation.

Having studied intensively the above problem, the inventors found that a catalyst with three metal components including a Group IA alkali metal on a porous carrier containing a specific amount of silica, which catalyst has a specified surface area, pore volume, and pore size distribution, can achieve the efficient removal of impurities in a heavy hydrocarbon oil and is also excellent as regards the decrease of sediment formation.

More in particular, the present invention is directed to a hydroprocessing catalyst comprising 7–20 wt. % of a Group VIB hydrogenation metal component, calculated as trioxide, 0.5–6 wt. % of a non-noble Group VIII hydrogenation metal component, calculated as oxide, and 0.1–2 wt. % of an alkali metal component, calculated as oxide, on a carrier, wherein the carrier comprises at least 3.5 wt. % of silica, calculated on the catalyst, the catalyst having a surface area of at least 150 $m^2$/g, a total pore volume of at least 0.55 ml/g, and a pore size distribution which is such, that 30–80% of the pore volume is present in pores with a diameter of 100–200 Å and at least 5% of the pore volume is present in pores with a diameter above 1000 Å.

The present invention is also directed to a process for hydroprocessing a heavy hydrocarbon feed in which a heavy hydrocarbon feed at least 50 wt. % of which boils above 538° C. (1000° F.) and which comprises at least 2 wt. % of sulphur and at least 5 wt. % of Conradson carbon is contacted at a temperature of 350–450° C. and a pressure of 5–25 MPa in the presence of hydrogen with the catalyst according to the invention.

It was found that the catalyst according to the invention, with its specified amounts of Group VIB metal, Group VIII metal, and Group IA metal on a carrier with a specific amount of silica, which catalyst has a specific surface area, pore volume, and pore size distribution, makes it possible to efficiently remove contaminants such as sulphur, nitrogen, metals, Conradson carbon, and/or asphaltenes from a heavy hydrocarbon feed while the formation of sediment is significantly reduced as compared to other catalysts. Additionally, a hydrocarbon oil boiling below 538° C. can be produced efficiently. Therefore, the hydroprocessing catalyst and process of the present invention will make the equipment operation more flexible without causing inconvenience and, furthermore, it is possible to perform efficient conversion into light oil with a low impurity content which satisfies the market standard.

The present invention is described in detail below.

The catalyst of the present invention comprises catalytic materials on a porous carrier. The catalytic materials present on the catalyst according to the invention comprise a Group VIB metal, a Group VIII metal, and a Group IA metal (alkali metal) of the Periodic Table of Elements applied by Chemical Abstract Services (CAS system).

As the Group VIII metals which can be used in the present invention, nickel, cobalt, iron, etc. may be mentioned. These compounds all have a high hydrogenation activity. However, in view of performance and economy, nickel is preferred.

As the Group VIB metals which can be used, molybdenum, tungsten, and chromium may be mentioned, but in view of performance and economy, molybdenum is preferred.

As a specific feature of the present invention an alkali metal which is a Group IA metal is present in the catalyst. Sodium and potassium may be mentioned as suitable materials. Sodium is preferred for reasons of performance and economy.

The combination of molybdenum, nickel, and sodium is particularly preferred for the catalytic materials of the catalyst according to the invention.

Based on the weight (100 wt. %) of the final catalyst including the carrier, the amounts of the respective catalytic materials are as follows.

The catalyst comprises 7–20 wt. %, preferably 8–16 wt. %, of Group VIB metal, calculated as trioxide. If less than 7 wt. % is used, the activity of the catalyst is insufficient. On the other hand, if more than 16 wt. %, in particular more than 20 wt. % is used, the catalytic performance is not improved further.

The catalyst comprises 0.5–6 wt. %, preferably 1–5 wt. %, of Group VIII metal, calculated as oxide. If the amount is less than 0.5 wt. %, the activity of the catalyst will be too low. If more than 6 wt. % is present, the catalyst performance will not be improved further.

The amount of Group IA metal is 0.1–2 wt. %, preferably 0.2–1 wt. %, calculated as oxide. If less than 0.1 wt. % is present, the desired effect will not be obtained. If more than 2 wt. % is present, the activity of the catalyst will be adversely affected.

The carrier of the catalyst according to the invention comprises at least 3.5 wt. % of silica, calculated on the weight of the final catalyst, preferably 3.5–30 wt. %, more preferably 4–12 wt. %, even more preferably 4.5–10 wt. %. If less than 3.5 wt. % of silica is present, the performance of the catalyst is insufficient.

The balance of the carrier of the catalyst according to the invention will generally be made up of alumina, optionally containing other refractory oxides, such as titania, zirconia, etc. It is preferred that the balance of the catalyst according to the invention is made up of at least 90% of alumina, more preferably at least 95%. It is preferred for the carrier of the catalyst of the invention to consist essentially of silica and alumina, the wording "consists essentially of being intended to mean that minor amounts of other components may be present, as long as they do not influence the catalytic activity of the catalyst.

At this point in time it is considered preferred for the catalyst according to the invention to consist essentially of the Group VIB metal component, the Group VIII metal component and the Group IA metal component on a carrier consisting essentially of silica and alumina, with the Group VI metal component, the Group VIII metal component and the Group IA metal component being a salt, oxide, or sulphide, depending on the circumstances. The presence of other components may detrimentally affect the properties of the catalyst.

It is important that the catalyst according to the invention has a surface area, pore volume, and pore size distribution which meet the following requirements.

The catalyst has a specific surface area of at least 150 $m^2/g$, preferably at least 175 $m^2/g$, more preferably between 185 and 250 $m^2/g$. If the specific surface area is less than 150 $m^2/g$, the performance of the catalyst is insufficient. The surface area is determined by nitrogen ($N_2$) adsorption using the B.E.T method. The total pore volume of the catalyst as determined by mercury intrusion is at least 0.55 ml/g, preferably 0.6–0.9 ml/g. If it is less than 0.55 ml/g, the performance of the catalyst is insufficient. The determination of total pore volume and pore size distribution is effected at a contact angle of 140° with a surface tension of 480 dynes/cm, using, for example, a mercury porosimeter Autopore II (trade name) produced by Micrometrics.

The catalyst according to the invention has 30–80% of the total pore volume in pores with a diameter of 100–200 Å, preferably 35–75%, more preferably 40–65%. If less than 30% of the pore volume is present in this range, the catalyst performance is insufficient. If more than 80% of the total pore volume is present in this range, the sediment formation increases.

At least 5% of the total pore volume is present in pores with a diameter above 1000 Å, preferably between 8 and 30%, more preferably between 8 and 25%. If less than 5% of the pore volume is present in this range, the asphaltene cracking activity decreases, which leads to increased sediment formation. If the percentage of pore volume present in pores with a diameter above 1000 Å is above 25%, particularly above 30%, the sediment formation may increase.

As indicated above, the carrier of the catalyst according to the invention comprises at least 3.5 wt. % of silica, calculated on the weight of the final catalyst, preferably 3.5–30 wt. %, more preferably 4–12 wt. %, even more preferably 4.5–10 wt. %, with the balance of the carrier of the catalyst according to the invention generally being made up of alumina, optionally containing other refractory oxides, such as titania, zirconia, etc., preferably essentially of alumina.

The carrier can be prepared in any suitable manner. In the following the carrier preparation will be illustrated by way of the preparation of a silica-alumina carrier. However, variations thereon leading to carriers additionally comprising other components such as zirconia or titania will be evident to the skilled person.

The silica-alumina can, for example, be produced by combining a silica source such as sodium silicate with an alumina source such as sodium aluminate or aluminium sulphate, or by mixing an alumina gel with a silica gel, followed by moulding, drying, and calcining. The carrier can also be produced by causing alumina to precipitate in the presence of silica in order to form an aggregate mixture of silica and alumina. Examples of such methods are adding a sodium aluminate solution to a silica hydrogel and increasing the pH by the addition of, e.g., sodium hydroxide to precipitate alumina, and coprecipitating sodium silicate with aluminium sulphate.

Among these various production methods the carrier used in the present invention is produced preferably by adding an acid aqueous solution of an aluminium compound to an alkaline solution in order to prepare an alumina gel, adding an alkali metal silicate thereto in order to prepare silica-alumina gel, followed by extruding, drying, and calcining to obtain a silica-alumina carrier particle.

A more concrete production method is described below.

First, an alkali solution such as sodium aluminate, ammonium hydroxide or sodium hydroxide is fed into a tank containing tap water or hot water, an acid solution of an aluminium source, e.g., aluminium sulphate or aluminium nitrate, is added, and the resulting mixture is mixed. The pH of the mixture changes as the reaction progresses. Preferable, after all the acid aluminium compound solution has been added, the pH is 7 to 9. After completion of the mixing an alumina hydrogel can be obtained.

Then, an alkali metal silicate such as a water glass or an organic silica solution is added as silica source. To mix the silica source, it can be fed into the tank together with the acid aluminium compound solution or after the aluminium hydrogel has been produced. If the silicate compound concentration in the liquid containing the alumina gel is controlled in a range of 5–10 wt. %, a carrier containing 3.5 wt. % or more of silica, calculated on the weight of the final catalyst, can be produced. By such mixing, a silica-alumina hydrogel can be obtained.

The obtained silica-alumina hydrogel is separated from the solution, and any commercially used washing treatment, for example a washing treatment using tap water or hot water, is carried out to remove impurities, mainly salts, from the gel. Then, the gel is shaped into particles in a manner known in the art, e.g., by way of extrusion, beading or pelletising.

Finally, the shaped silica-alumina particles are dried and calcined. The drying condition is room temperature to 200° C. in the presence of air, and the calcining condition is 300 to 900° C., preferably 600 to 850° C., in the presence of air.

By the above production method, it is possible to obtain a silica-alumina carrier containing a desired amount of silica and having properties which will give a catalyst with the surface area, pore volume, and pore size distribution characteristics specified above. The surface area, pore volume, and pore size distribution characteristics can be adjusted in a manner know to the skilled person, for example by the addition during the mixing or shaping step of an acid, such as nitric acid, acetic acid or formic acid, or other compounds as moulding auxiliary, or by regulating the water content of the silica-alumina gel by adding or removing water.

The carrier to be used in the catalyst according to the invention preferably has a surface area of 180–300 m² /µg, more preferably 190–240 m²/g, and a total pore volume of 0.5–1 ml/g, preferably 0.6–0.9 ml/g.

The Group VIB metal components, Group VIII metal components, and Group IA metal components can be incorporated into the catalyst carrier in a conventional manner, e.g., by impregnation and/or by incorporation into the support material before it is shaped into particles. At this point in time it is considered preferred to first prepare the carrier and incorporate the catalytic materials into the carrier after it has been dried and calcined. The metal components can be incorporated into the catalyst composition in the form of suitable precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. Suitable Group IA metal precursors include nitrates. The impregnation solution, if applied, may contain other compounds the use of which is known in the art, such as organic acids, e.g., citric acid. It will be clear to the skilled person that there is a wide range of variations on this method. Thus, it is possible to apply a plurality of impregnating steps, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the active metals have been incorporated into the catalyst composition, it is optionally dried in air flow for about 0.5 to 16 hours at a temperature between room temperature and 200° C., and subsequently calcined in air for about 1 to 6 hours, preferably 1–3 hours at 200–800° C., preferably 450–600° C. The drying is done to physically remove the deposited water. The calcining is done to bring at least part, preferably all, of the metal component precursors to the oxide form.

The catalyst particles may have the shapes and dimensions common to the art. Thus, the particles may be spherical, cylindrical, or polylobal and their diameter may range from 0.5 to 10 mm. Particles with a diameter of 0.5–3 mm, preferably 0.7–1.2 mm, for example 0.9–1 mm, and a length of 2–10 mm, for example 2.5–4.55 mm, are preferred.

It may be desirable to convert the catalyst, i.e., the Group VIB and Group VIII metal components present therein, into the sulphidic form prior to its use in the hydroprocessing of hydrocarbon feedstocks. This may be done in an otherwise conventional manner, e.g., by contacting the catalyst in the reactor at increasing temperature with hydrogen and a sulphur-containing feedstock, or with a mixture of hydrogen and hydrogen sulphide.

The catalyst of the present invention is particularly suitable for the hydroprocessing of heavy hydrocarbon feeds, in particular heavy feedstocks of which at least 50 wt. % boils above 538° C. (1,000° F.) and which comprise at least 2 wt. % of sulphur and at least 5 wt. % of Conradson carbon, by contacting the feed with the catalyst of the present invention in the presence of hydrogen under conditions of elevated temperature and pressure.

The sulphur content of the feedstock may be above 3 wt. %. Its Conradson carbon content may be above 8 wt. %.

The feedstock may contain contaminant metals, such as nickel and vanadium. Typically, these metals are present in an amount of at least 20 wtppm, calculated on the total of Ni and V, more particularly in an amount of at least 30 wtppm.

Suitable feedstocks include feedstocks comprising heavy atmospheric residues, such as atmospheric residue (AR), vacuum residue, and mixtures thereof.

The process of this invention can be carried out in a fixed bed, in a moving bed, or in an ebullated bed. It is preferred to carry out the process under isothermal conditions, in particular in an ebullated bed.

The process conditions for the process according to the invention may be as follows. The temperature generally is 350–450° C., preferably 400–440° C. The pressure generally is 5–25 MPA, preferably 14–19 MPA. The liquid hourly space velocity generally is 0.1–3 h-1, preferably 0.3–2 h-1. The hydrogen to feed ratio generally is 300–1500 NI/I, preferably 600–1000 NI/I. The process is carried out in the liquid phase.

The present invention will be illustrated by the following examples.

EXAMPLE 1

To produce a silica-alumina carrier, a sodium aluminate solution was supplied to a tank containing tap water, and an aluminium sulphate solution and a sodium silicate solution were added and mixed. When the addition of the aluminium sulphate solution was completed, the mixture had a pH of 8.5. By such mixing a silica-alumina gel was produced. In this case the sodium silicate concentration was set at 1.62 wt. % of the alumina gel solution. The silica-alumina gel was isolated by filtration and washed with hot water to remove impurities from the gel. It was then extruded into cylindrical grains with a diameter of 0.9–1 mm and a length of 3.5 mm. The resulting particles were dried in air at a temperature of 120° C. for 16 hours and subsequently calcined in silica-content of the obtained carrier was 7 wt. %.

One hundred grams of the silica-alumina carrier were impregnated with 100 ml of an impregnation solution containing 16.4 g of ammonium molybdate tetrahydrate, 9.8 g of nickel nitrate hexahydrate, 0.66 g of sodium nitrate, and 50 ml of 25% ammonia water. The impregnated carrier was then dried at a temperature of 120° C. for 30 minutes and calcined in a kiln for 1.5 hours at 540° C. to produce a final catalyst in accordance with the invention, further indicated as Catalyst 1. The composition and properties of this catalyst are given in Table 1.

Comparative Catalysts 1, 2, and 3 were produced in the same way as described above for Catalyst 1, except that the sodium silicate concentration in the alumina gel aqueous solution was changed to 0.45 wt. % (Comparative Catalyst 1), 0.53 wt. % (Comparative Catalyst 2), and 1.39 wt. % (Comparative Catalyst 3), resulting in catalyst carriers with silica contents of 2.4 wt. %, 2.2 wt. %., and 6.0 wt. %, respectively.

Catalysts were prepared from these carriers in the same way as described for Catalyst 1, except that the amounts of catalytic metals present in the impregnation solution were adjusted to give the metal contents given below in Table 1.

TABLE 1

| Catalyst | Catalyst 1 | Comparative Catalyst 1 | Comparative Catalyst 2 | Comparative Catalyst 3 |
|---|---|---|---|---|
| MoO$_3$ (wt. %) | 11.5 | 11.4 | 11.4 | 11.6 |
| NiO (wt. %) | 2 | 2 | 2 | 2 |
| Na$_2$O (wt. %) | 0.26 | 0.05 | 0.29 | 0.06 |
| SiO$_2$ (wt. %) | 6 | 2.1 | 1.9 | 5.2 |
| balance | alumina | alumina | alumina | alumina |
| surface area (m$^2$/g) | 214 | 212 | 211 | 205 |
| pore volume (ml/g) | 0.75 | 0.73 | 0.75 | 0.75 |
| % PV (100–200 Å) | 65 | 63 | 64 | 63 |
| % PV (>1000 Å) | 10 | 11 | 10 | 10 |
| % PV (<100 Å) | 12 | 13 | 12 | 13 |

Catalyst 1 and Comparative Catalysts 1, 2, and 3 were tested in hydroprocessing of a heavy hydrocarbon feedstock. The feedstock used in these examples was a heavy oil consisting of 50 wt. % of atmospheric residue (AR) and 50 wt. % of vacuum residue (VR) obtained by fractional distillation of Middle East (Kuwait) oil having the following properties:

| | |
|---|---|
| Sulphur (wt. %) | 4.79 |
| Nitrogen (wppm) | 2890 |
| Vanadium (wppm) | 85 |
| Nickel (wppm) | 26 |
| Conradson Carbon Residue (wt. %) | 16.2 |
| Normal heptane insoluble components (wt. %) | 6.0 |
| Fraction boiling above 538° C. (wt. %) (ASTM D 5307) | 75 |
| Density (g/ml, 15°C.) | 1.0048 |

50 ml of the catalyst to be tested was packed into a fixed bed reactor. The feedstock was introduced into the unit at a liquid hourly space velocity of 1.0 h-1, a pressure of 14.7 MPA, an average temperature of 427° C. in the fixed bed, with the ratio of supplied hydrogen to feedstock (H$_2$/oil) being kept at 800 NI/I. The process was carried out in the liquid phase.

The oil product produced by this process was collected and analysed to calculate the amounts of sulphur (S), Conradson carbon (CCR), nitrogen (N), metals, (M), and asphaltene (Asp) removed by the process. The relative volume activity values were obtained from the following formula.

$$RVA = 100 * k(\text{tested catalyst})/k(\text{Comparative Catalyst 1})$$

wherein for HDS $$k = (LHSV/(0.7)) * (1/y^{0.7} - 1/x^{0.7})$$

and for HDN, HDM, CCR reduction and asphaltene reduction $$k = LHSV * \ln(x/y)$$

with x being the content of S, N, CCR, M, or Asp in the feedstock, and being the content of S, N, CCR, M, or Asp in the product.

The results are given in Table 2:

TABLE 2

| Catalyst | Catalyst 1 | Comparative Catalyst 1 | Comparative Catalyst 2 | Comparative Catalyst 3 |
|---|---|---|---|---|
| RVA HDS | 118 | 100 | 99 | 112 |
| RVA CCR | 114 | 100 | 101 | 115 |
| RVA HDM | 105 | 100 | 101 | 100 |
| RVA HDN | 143 | 100 | 97 | 157 |
| RVA Asp | 108 | 100 | 102 | 105 |
| Conversion[1] | 55 | 49 | 48 | 56 |
| Sediment formation[2] | 0.32 | 0.38 | 0.4 | 0.65 |

[1]conversion of the fraction boiling above 538° C. into material boiling below 538° C.
[2]sediment is determined in accordance with method No. 375 of the English Institute of Petroleum.

From this Table it can be seen that, as compared to Comparative Catalyst 1 which has a sodium content and silica content outside the scope of the present invention, Catalyst 1 shows a decrease in sediment formation in combination with good hydrodesulphurisation and hydrodenitrogenation performance. Comparative Catalyst 2, which has a sodium content in accordance with the present invention but a too low silica content, shows essentially the same results as Comparative Catalyst 1. Comparative Catalyst 3, which has a silica content in accordance with the present invention but a too low sodium content, shows RVA activities comparable to those of Catalyst 1, but has a very high sediment formation, which may cause serious problems in the petroleum refining process.

EXAMPLE 2

Catalyst 2 was prepared as follows: a catalyst carrier was produced in the same way as described in Example 1, except that the sodium silicate concentration in the alumina gel aqueous solution was 1.2 wt. % and the silica content of the silica-alumina carrier was 5.2 wt. %. A catalyst was prepared from said carrier in the same way as described in Example 1.

Comparative Catalyst 4 was prepared as follows: an alumina carrier was prepared as described above for Catalyst 2, except that no silica source was added. A catalyst was prepared from said carrier in the same way as described in Example 1.

Comparative Catalyst 5 is a conventional hydrotreating catalyst with the properties an composition given in Table 3.

The composition and properties of Catalyst 2 and Comparative Catalysts 4 and 5 are given in Table 3.

TABLE 3

| Catalyst | Catalyst 2 | Comparative Catalyst 4 | Comparative Catalyst 5 |
|---|---|---|---|
| $MoO_3$ (wt. %) | 11.4 | 11.5 | 12.5 |
| NiO (wt. %) | 2 | 2 | 4.5 |
| $Na_2O$ (wt. %) | 0.26 | 0.06 | 0.1 |
| $SiO_2$ (wt. %) | 4.5 | 0 | 0.6 |
| alumina | balance | balance | balance |
| surface area ($m^2/g$) | 195 | 182 | 339 |
| pore volume (ml/g) | 0.76 | 0.73 | 0.62 |
| % PV (100–200 Å) | 47 | 55 | 8 |
| % PV (>1000 Å) | 21 | 19 | 19 |
| % PV (<100 Å) | 7 | 15 | 60 |

Catalyst 2 and Comparative Catalysts 4 and 5 were tested in the same way as described in Example 1. The product properties were analysed and the RVA activities calculated as described in Example 1, except that Comparative Catalyst 5 was used as standard. The results are given in Table 4.

TABLE 4

| | Catalyst 2 | Comparative Catalyst 4 | Comparative Catalyst 5 |
|---|---|---|---|
| RVA HDS | 107 | 106 | 100 |
| RVA CCR | 107 | 102 | 100 |
| RVA HDM | 120 | 95 | 100 |
| RVA HDN | 113 | 68 | 100 |
| RVA Asp | 117 | 105 | 100 |
| Conversion | 54 | 49 | 51 |
| Sediment formation | 0.20 | 0.19 | 0.33 |

As appears from the above table, Catalyst 2 according to the invention shows less sediment formation and has a higher activity, in particular as to hydrodemetallisation and asphaltene reduction, than Comparative Catalyst 5. Catalyst 2 shows a higher activity as to hydrodemetallisation, hydrodenitrogenation, and asphaltene reduction than Comparative Catalyst 4, which is outside the scope of the present invention in view of its low sodium content and silica content.

What is claimed is:

1. A hydroprocessing catalyst comprising 7–20 wt. % of a Group VIB hydrogenation metal component, calculated as trioxide, 0.5–6 wt. % of a non-noble Group Vil hydrogenation metal component, calculated as oxide, and 0.1–2 wt. % of an alkali metal component, calculated as oxide, on a carrier, wherein the carrier comprises at least 3.5 wt. % of silica, calculated on the catalyst, the catalyst having a surface area of at least 150 $m^2/g$, a total pore volume of at least 0.55 ml/g, and a pore size distribution which is such that 30–80% of the pore volume is present in pores with a diameter of 100–200 Å, and at least 5% of the pore volume is present in pores with a diameter above 1000 Å.

2. The catalyst of claim 1 wherein less than 25% of the total pore volume is in pores with a diameter of less than 100 Å.

3. The catalyst of claim 1 wherein said catalyst has a surface area of between 185 $m^2/g$ and 250 $m^2/g$, a total pore volume of 0.6–0.9 ml/g, 40–65% of its pore volume present in pores with a diameter of 100–200 Å, 8–25% of its pore volume in pores with a diameter of above 1000 Å, and less than 20% of its pore volume in pores with a diameter of less than 100 Å.

4. The catalyst of claim 1 wherein the catalyst carrier comprises 4.5–10 wt. % of silica, calculated on the weight of the catalyst.

5. The catalyst of claim 1 wherein the balance of the carrier is alumina.

6. The catalyst of claim 1 wherein said catalyst contains 0.2–1 wt. % of sodium oxide as Group IA metal oxide.

7. A process for hydroprocessing a heavy hydrocarbon feed in which a heavy hydrocarbon feed at least 50 wt. % of which boils above 538° C. (1,000° F.) and which comprises at least 2 wt. % of sulfur and at least 5 wt. % of Conradson carbon is contacted at a temperature of 350–450° C. and a pressure of 5–25 MPA in the presence of hydrogen with the catalyst of claim 1.

8. The process of claim 7 wherein the feed comprises at least 3 wt. % of sulfur and at least 8 wt. % of Conradson carbon.

9. The process of claim 7 wherein the feed has a metals content, calculated on the total of Ni and V, of at least 20 wtppm.

10. The process of claim 7 wherein said process is carried out under isothermal conditions.

11. The process of claim 9 wherein the feed has a metals content, calculated on the total of Ni and V, of at least 30 wtppm.

12. The process of claim 10 wherein said process is carried out in the form of an ebullated bed.

* * * * *